United States Patent Office 3,096,145
Patented July 2, 1963

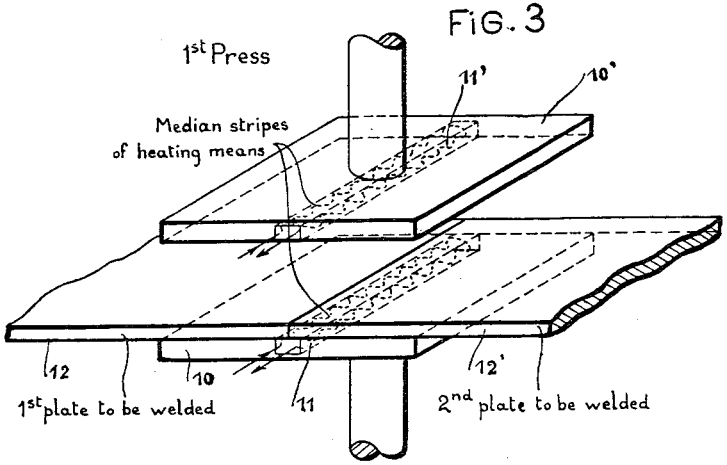
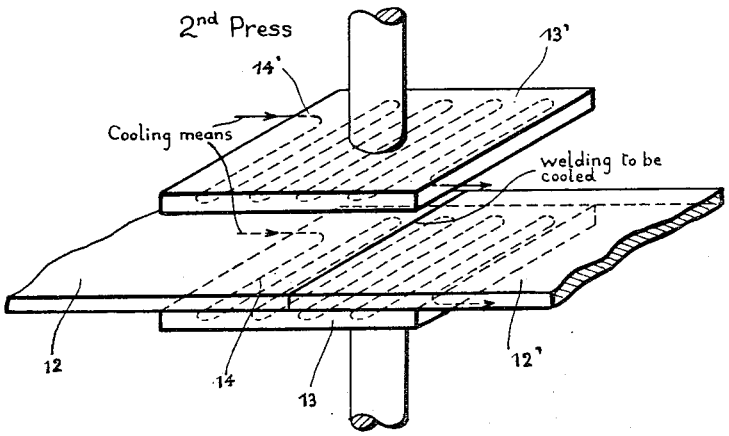

3,096,145
PROCESS OF MAKING PLATES AND SHEETS OF POLYVINYL CHLORIDE FRAGMENTS BY A SIMULTANEOUS HEAT AND PRESSURE TREATMENT
Boris Carnaut, 53 Rue de Rennes, Paris, France
Filed May 6, 1958, Ser. No. 733,261
Claims priority, application France May 7, 1957
3 Claims. (Cl. 18—55)

One already knows how to make, from thermoplastic material, plates or sheets which, in many cases, can serve as substitutes for cardboards over which they offer many advantages, but their high manufacturing cost has up to now set limits to their use.

This high manufacturing cost resulted, on the one hand, from the cost of the raw material used and, on the other hand, from the importance of the equipment required for this manufacturing: in most of the known processes, use is made of calendering, injection or extrusion of the powdered matter; the known processes operating by way of a thermal compression require the use of high pressures, of about 50 kg./sq. cm. as the plates of the press are maintained at a temperature very much lower than the decomposition temperature of the thermoplastic material used (e.g., the decomposition temperature is 220° C. for polyvinyl chloride) thereby resulting in only a rather limited softening of the material.

Plates and sheets made of a thermoplastic material by either a calendering, an injection or an extrusion technique, have a fibrous structure resulting from the formation of long parallel molecular chains: this structure results in a low dimensional stability and a high mechanical anisotropy, as their tensile strength and resistance to tear and to abrasion are low, particularly in some directions.

If, on the other hand, it is desired to obtain flexible plates from non-plasticized thermoplastics, their thickness must be limited to about 0.8 mm. as, beyond the value, their stiffness would be prohibitive. To obtain thicker plates, a thermowelding process carried out by thermally compressing several superposed thin sheets becomes necessary.

On the other hand, the thermal calendering of non-plasticized thermoplastics must often be facilitated by admixing of small amounts of a plasticizer. The equipment to operate this known process is, however, expensive and cumbersome, and the width of the calenders limits the width of the sheets they can produce.

One also knows how to manufacture thick plates by a calendering step, and the thermal compression of several sheets made of a slightly plasticized thermoplastic, the plates thus obtained being then divided into fragments which are used as a raw material to make, by injection or extrusion, comparatively rigid objects.

A still further teaching of the prior art involves the manufacture of plates and sheets from thermoplastic waste, but only by calendering or extrusion. These processes involve an intimate mixture of the waste, and when the waste products have different colors, the resulting plate or sheet shows a poorly defined color and thereby has a small commercial value. In addition, the waste products of two important classes of thermoplastics cannot be re-used according to this process. These classes are:

(1) Non-plasticized resins, such as polyvinyl chloride;
(2) Plasticized or non-plasticized resins, such as polyvinyl chloride containing organic fibres or metallic particles.

In practice, it has been found that the calendering or the extrusion of the waste products of these two classes was impossible, as the softening temperature of the waste in the first class is too high; and as it is impossible to join conveniently together, either by rolling or by extrusion, the waste products of the second class containing organic fibres or metallic particles.

Similarly, the thermal compression of these two classes of waste products has met with the difficulty which consists on the one hand of forming an even layer and on the other hand of accurately controlling the working conditions, particularly the temperature and pressure allowing to obtain homogeneous plates or sheets.

The object of this invention is to provide a novel process for the fabrication of thermoplastic sheets. Upon further study of the specification and appended claims, other objects and advantages of the invention will become apparent.

The process according to the invention overcomes all the above mentioned drawbacks: it is characterized in that the thermoplastic is first cleaned of all its impurities, for instance by washing, floating or saponification, then with an eventual addition of a filler and/or plasticizers, reduced to grains or to powder: an even layer is formed and exposed to the action of pressure means, preferably heated at or about the decomposition temperature of the thermoplastic: the pressure means first apply upon the thermoplastic a pressure just high enough to blow out laterally the air it contains and, when the material is at a temperature slightly below its decomposition temperature, a higher pressure is applied, the value and duration of which are selected to prevent the total decomposition of the material and the plate or sheet thus obtained is subjected to rapid cooling under pressure.

The present invention is also concerned with new industrial products obtained by means of this process and also with a plant for making the same.

The manufacturing cost of the plates and sheets obtained by means of this new process is much lower than the cost of the plates and sheets obtained with the previously known processes, and these new plates and sheets have internal and superficial homogeneousness, mechanical properties and a resistance to chemicals, which characteristics are as good as the plates and sheets previously obtained. This reduction of the manufacturing cost results from the use of relatively low pressures which can be delivered by means of presses or calenders of a plain structure which thereby entails moderate investments.

This reduction of the pressures which are necessary to agglomerate the particles of matter results from the use, according to the invention, in the pressing process, of higher temperatures particularly neighbouring the decomposition temperature of the thermoplastic and sufficient to produce a high softening, the operation being obviously carried out with a great accuracy so that the matter will never decompose entirely.

On the other hand, the process according to the invention allows the fabrication of plates and sheets having a heterogeneous granular structure resulting in a noteworthy dimensional stability and mechanical isotropy. This structure results from the fact that these plates and sheets are made by compressing an even layer of grains of a thermoplastic plasticized or not, these grains being obtained by dividing into fragments, sheets or plates which have previously been made, for instance by calendering the powdered matter.

Furthermore, the process according to the invention allows the production of plates or sheets directly, that is to say by means of a single hot pressing, and having an important thickness, a few millimeters for instance, with no limitation, this thickness being limited by the single condition that the conditions of pressure, temperature and duration under which the pressing process has been carried out are adapted to the thickness of the finished product.

The process according to the invention can be applied directly to powdered, non plasticized, thermoplastics, such as polyvinyl chloride, without having to add a plasticizer.

On the other hand, as an important reduction of the thermoplasticity of the matter under treatment is sometimes required, it is possible, according to the present invention, to add to this matter important amounts of colored pigments and/or charges, thus allowing the production of finished products having a more even and sustained tint and a much lower manufacturing cost.

Several specific embodiments of a plant for carrying out the process of the invention are shown in the drawings, wherein:

FIGURES 3 and 4 are perspective views of two presses comprised in a plant for the welding edge to edge of two plates of thermoplastic matter.

Figure 1:
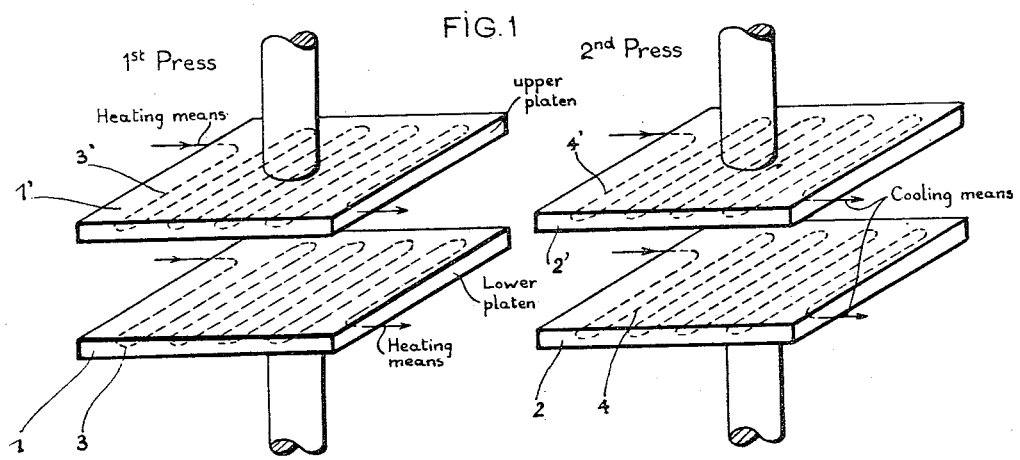
FIGURE 1 is a perspective view of a plant for the making of plates and sheets with small-sized fragments of thermoplastic matters.

The thermal pressing of thermoplastics, which is an apparently simple operation, has nevertheless up to now not yielded to satisfactory results as, to carry out the operation to a successful issue, it is absolutely necessary to correctly distribute the matter, to coordinate the fineness of the crushing (in powder or in grains), the thickness of the plates to be pressed, and also the temperature, the pressure and the duration of the operation. These various factors are intimately related and a given balance must be complied with in order to obtain a suitable cohesion of the matter and a good homogeneousness of its surfaces.

The thickness of the plates obtained from given grains is in inverse ratio to the fineness of these grains. Obviously this thickness cannot be smaller than the diameter of the larger grains.

In a first embodiment of the process according to the invention, polyvinyl chloride, non plasticized and in the shape of a dry powder, and, to this end, preferably obtained by mass or suspension polymerization, is distributed in an even layer having a uniform thickness upon the lower plate of a heating press, according to one of the methods which is described hereafter.

This press is then heated up to a temperature neighbouring the decomposition temperature of the matter or above this temperature.

The layer formed as explained is first subjected, before reaching the temperature of the press, to a small pressure, for instance 200 gr./sq. cm., to expel the air contained therein which will escape through the edges of the layer, whereas, if the pressure at the beginning had been stronger, for instance 2 kg./sq. cm., the air should have escaped only after the starting of the superficial fusion of the layer and in the shape of bubbles forming blisters on the upper surface and impairing the homogeneousness.

When the layer has reached a temperature slightly below the break down temperature of the matter from which it is made, it is then subjected to a higher pressure. This pressure, the time during which it is exerted same as the temperature of the press, as to be chosen in relation with the thermoplastic, with the size of its grains and with the thickness of the plate or sheet to be obtained so as to avoid the creep.

According to the invention, this second pressing is to be made under a pressure ranging from 2 to 5 kg./sq. cm., the temperature of the press being kept above 200° C. for the polyvinyl chloride: the process is to last from 30 seconds to 10 minutes.

As a general rule, according to the invention, the temperature of the press is chosen in the vicinity of or above the break-down temperature of the matter under treatment (220° C. for polyvinyl chloride) but the high pressure is exerted only during a time interval short enough to avoid a complete break-down of the material when it reaches and remains too long at the temperature of the press.

This new method offers the advantage of reducing the duration of the pressing process as a result of the use of a temperature in the press high enough to overcome the important thermal inertia of the matter under treatment, resulting from its low thermal conductivity. It is obviously necessary to prevent, by limiting the duration of the heating, the starting of alteration of the surfaces of the sheet or plate which are directly exposed to the action of the heating elements of the press.

Experiments have shown that a pressing process, when exerted during an excessive time, even at a temperature fairly below the break-down temperature of the matter under treatment (for instance at 180° C. for polyvinyl chloride) does not bring about a softening of the matter sufficient to obtain a homogeneous structure but, on the contrary, causes a break-down.

By way of example, when using a mixture containing 80 parts of powdered, non-plasticized, polyvinyl chloride, 10 parts of $TiO_2$ and 2 parts of lead stearate, to obtain a plate having a thickness of 1.5 mm. and a perfectly homogeneous internal and superficial structure, the pressing process is to be carried out under a pressure of about 2 kg./sq. cm., and in interdependent conditions of heat and temperature, as shown in the following table.

| Temperature: | Duration |
|---|---|
| 200° C | 3 minutes. |
| 240° C | 2 minutes 30 seconds. |
| 260° C | 2 minutes. |
| 280° C | 1 minute. |
| 300° C | 30 seconds. |

The heating times mentioned above are good only with the conventional heating presses, equipped with electric resistors or a hot fluid; they can be notably smaller when a dielectric heating is used (for instance 30 seconds instead of 2 minutes).

To obtain thicker plates, it is necessary to operate under a smaller pressure, in order to avoid any substantial creep, and to correspondingly increase the temperature and/or the duration of the pressing process.

The distribution of the powder or of the grains in an even layer on the lower plate of the press may be carried out by placing on this plate a grid having wide meshes (for instance 4 sq. cm. for a plate of 1 square meter) and made of stretched wires: the thickness of the layer formed by pouring in bulk the powder or the grains on this grid is made uniform with a scraper.

The particles of waste products may also be exposed to the action of an electric field directed towards the lower plate of the press previously coated with a paste, preferably a gel of plastics, for instance a mixture in equal proportions of butyl phthalate and polyvinyl chloride, at the rate of 200 gr. per square meter of the plate. This last method is similar to the flocking process used for the manufacture of special fabrics.

After the heat pressing process, the plate or sheet is quickly cooled, preferably under the same pressure, to prevent any damage in the surface resulting from the introduction of air between the pressing plate and the layer of matter.

The easiest method for carrying out this operation, when the plates of the press are heated by a hot fluid, is evidently to substitute the hot fluid by a cold fluid, the pressure of the press remaining the same. But this mode of cooling runs the risk not to be fast enough to prevent the damage of the plate or of the sheet by an extreme superficial heating delayed by the thermal inertia. Furthermore, the duration of the cold pressing process could be much greater than the duration of the hot pressing process, thus resulting in an important consumption of caloric energy, corresponding to a great increase of the manufacturing cost. Therefore, the present invention provides preferably for a cooling under pressure carried out with another press.

In the case of the polyvinyl chloride for instance, the plates or sheets taken out of the first press at a temperature above 200° C. are piled up with their supporting plates, in bundles of five to ten plates; each bundle is transferred as fast as possible in another press, heated only at 130° C. which also compresses the bundle under a pressure of about 2 kg./sq. cm.; each bundle is kept in this second press just for the time required to allow to tighten the plates or sheets of the bundle by means of clamps; the clamped bundle is then immediately taken out of the press and kept in the open air to come back slowly to the ambient temperature, while being subjected, by means of said clamps, to a pressure close to its initial pressure. Transportation of the piled up sheets or plates from the first hot press into the second press entails but an unsignificant cooling of said sheets or plates on account of the high thermal inertia of the matter which they are made of.

A still simpler way for carrying out the individual cooling of each plate or sheet consists in keeping it in the second press, cooled by a water circulation, under a pressure (2 kg./sq. cm. in the chosen example) and during a time interval (3 minutes) equal to the pressure and time of the heat pressing process in the first press, the cooling of the plate or sheet being completed in the open air. As a result of the thermal inertia of the matter, the plate or sheet can be placed in the cold press in a still sufficiently plastic condition to allow a comparatively low pressure in this press to give a good homogeneousness to its surfaces.

According to a modification of the above manufacturing process, any sort of charge, in a ratio of 50% and even more, is mixed before any treatment with the powdered, non plasticized, polyvinyl chloride, thus allowing to obtain plates or sheets having a greater stiffness when heated.

Of course, it is also possible to obtain strengthened plates by providing them with a reinforcement made for instance of a wire-netting or of a fibrous matter, a texile or paper, this reinforcement being placed on one of the faces of the plate or embedded in this plate, to facilitate a uniform distribution of the particles.

Finally, it is sometimes advantageous to add to the crushed mixture from 1 to 2% of paraffin, stearin or a similar lubricant.

Figure 2:
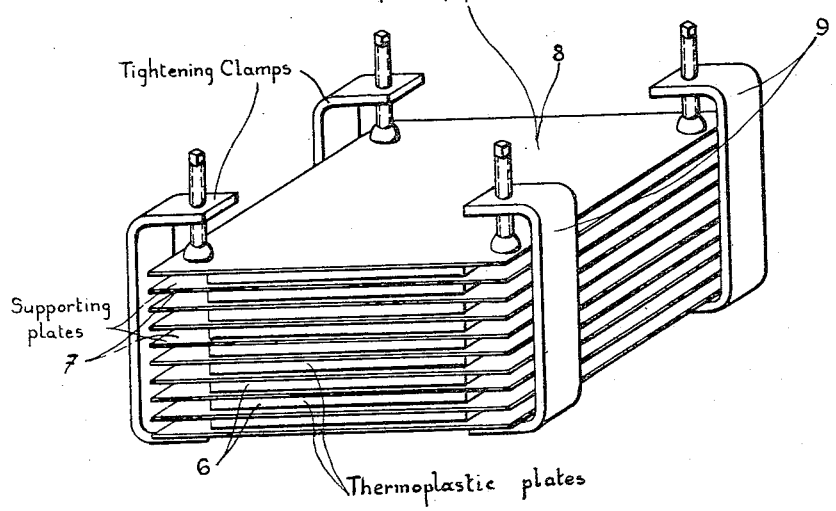
FIGURE 2 is a perspective view of thermoplastic plates clamped with their supporting plates so as to cool under pressure.

Referring to FIGURE 1 of the drawing, the plant for carrying out the above described embodiment of the process according to the invention comprises essentially a first press, the two platens 1, 1' of which are equipped with heating means 3, 3', and a second press, the two platens 2, 2' of which are equipped with cooling means 4, 4'; after agglomeration of the thermoplastic layer by heat and pressure in the first press 1, 1', this agglomerated layer is rapidly transferred into the second press 2, 2', in which it is cooled under pressure. The thermoplastic matter can be also agglomerated in the first press 1, 1' between two rigid supporting plates, and, as illustrated by FIGURE 2, the successively agglomerated thermoplastic plates 6 can be piled up with their supporting plates 7, on the lower platen of the second press, so as to form a bundle 8, which can be tightened by means of clamps 9, while being subjected to a suitable pressure in said second press; the clamped bundle 8 can be afterwards withdrawn from said second press and left in the open air so as to cool under pressure.

According to another embodiment of the process according to the invention, the powder of plasticized polyvinyl chloride is transformed into plates or sheets by a pressing process according to the invention, or even by calendering or extrusion according to one of the already known processes: the plates or sheets thus obtained are divided into fragments or grains the sizes of which are to be adapted to the thickness of the final product.

The grains are then disposed on the lower plate of a heating press, in a layer having the suitable uniform thickness and the following steps are the same as in the above described first process.

In the case of grains of polyvinyl chloride plasticized at 40% or of polystyrene, the two following examples show the relation to be observed between, on the one hand, the physical conditions of the pressing process and, on the other hand, the sizes of the grains and the thickness of the plate or sheet obtained.

First example:
 Mean surface of the grains_____sq. mm__ 4
 Thickness of the plate_____mm__ 3
 Temperature of the pressing process_____° C__ 160
 Pressure of the pressing process___kg./sq. cm__ 2
 Duration of the pressing process_____minutes__ 15
Second example:
 Mean surface of the grains_____sq. mm__ 1
 Thickness of the plate_____mm__ 1.5
 Temperature of the pressing process_____° C__ 180
 Pressure of the pressing process___kg./sq. cm__ 1
 Duration of the pressing process____minutes__ 10

Of course, the durations of the pressing process in the two above examples are rather long, on account of the comparatively low temperatures used. The present invention preferably advocates the use of higher pressing temperatures as, for the same pressure, they allow shorter durations for the pressing process.

The plates or sheets thus obtained have the appearance of mosaics, eventually with varied colors and they have a granular heterogeneous structure which gives them mechanical properties quite different of the properties of the plates or sheets obtained for instance by calendering and having thereby a fibrous structure. Particularly, they have no mechanical anisotropy and their tensile strength, their resistance to tearing and to abrasion, like also their dimensional stability are much greater than in the products obtained by calendering or extrusion.

According to another form of the preceding operation, one starts from thermoplastics waste products, eventually not plasticized; the individual colors of the waste products can be revalorized if, before being distributed on the plate of the press, they go through the following steps:

(1) Crushing in rather coarse grains.
(2) Passing through two homogenizing drums, each having a mean capacity of 5 cubic meters.
(3) Additional kneading in a homogenizing drum having a capacity of about 1 cubic meter.

A mosaic having a great ornamental value is thus obtained, in which the harmony of the colors results from the intimate mixing of all the particles having various colorations, including nearly all the fundamental tints.

Eventually, it is possible to modify the mosaics by suitably sorting the waste products having a given color and using them to form superficial layers.

According to a third embodiment of the process according to the invention, a continuous production can be obtained by distributing, by means of a funnel provided with an output governor, the grains or the powder on an endless band, so as to form thereupon a layer of matter, and by driving this band with the layer of matter between heated polished cylinders, afterwards through a calender cooled for instance by a water circulation. In such a case, it is advantageous to insert a flexible sheet, for instance a sheet of paper, between the layer of matter and the upper cylinders, to prevent any sticking. This mode of execution of the process according to the invention differs from the known process using a calendering in that the matter of the layer is not brought to a complete fusion but just sufficiently softened to bring about the massing together of its particles or grains.

According to the invention, it is also possible to obtain sheets having a regular thickness by preparing thin and apparently heterogeneous sheets which are subsequently welded upon each other by a combined action of heat and pressure.

The process according to the invention may also be used to weld together, end to end, plates or sheets of thermoplastics as illustrated by FIGURES 3 and 4. For this operation, a special heating press is required (FIGURE 3), in which at least one of the platens 10, 10' is provided with heating elements 11, 11' arranged along a narrow median stripe. The two plates or sheets 12, 12' are placed in the press, the two edges to be welded abutting along the axis of the heating stripe. The pressing is carried out at a temperature ranging from 240° C. to 300° C. during a suitable time, varying from 3 minutes to 30 seconds. The connection between the two edges to be welded can be facilitated by an addition of powdered resin. The cooling of the welding must be carried out under pressure, according to the requirements above described for the making of plates or sheets, for instance in a second press (FIGURE 4), the two platens 13, 13' of which are provided with cooling elements 14, 14'. Of course, the heating system 11, 11' of the first press may be a dielectric one.

The welds carried out according to the invention process are particularly strong and practically invisible.

The process according to the invention allows also to weld plates or sheets made of a thermoplastic upon each other to obtain, for instance, thicker plates or sheets while avoiding the many drawbacks of the thermowelding process used up to now. In this last process, the temperatures were relatively lower (for instance 180° C. instead of over 200° C.) and the pressures were relatively higher (for instance 40 kg./sq. cm. instead of 2 kg./sq. cm.), and special precautions were necessary to prevent the running of the mass.

The industrial product, in plates or sheets, obtained with the process according to the invention, when applied to a mixture of thermoplastics waste and of paper-pulp, in such an amount that it can be considered a charge (less than 50% in the finished product, has particularly interesting mechanical properties and a resistance to heat and to chemical agents.

This industrial product, obtained by mixing in a refining-trough the thermoplastics waste with an amount of paper pulp corresponding to a weight of dry matter comprised between 10% and 50% of the weight of the waste, is a new product.

The addition to the paper pulp of natural or synthetic resins to act as a binder for the paper fibres is known in the paper and cardboard making business, but the amount of resins is always very small, a few percent, and in all cases, it is very much smaller than 50% of the weight of dry matter.

The new product according to the invention contains on the contrary, for one part of paper pulp, its weight of dry matter being taken in consideration, from 1 to 10 parts of thermoplastics waste. In the first step of the process, the dry particles of the waste lack entirely in cohesion and it is the paper pulp which acts, at least temporarily, as a binding agent.

According to the invention, this mixing is directly carried out in the refining trough: the stirring helps at the utmost the interpenetration of the plastic matter and of the paper fibres. To make possible the massing together of an important amount of thermoplastics waste, the paper pulp will be kept in a rather viscous state during the stirring in the trough, in the presence of a rather small amount of water.

The cohesion of the mixture effected in the trough can be increased by the addition of suitable matters, for instance, of resin soap, its amount being generally greater than the amount used for the sizing of the paper.

When the thermoplastics waste is formed of powdered rubber, obtained generally with old tyre residues, the addition of aluminium sulphate, also used for the sizing of the paper, allows to set free the abietic acid which combines later with rubber.

The mixture issuing from the refining trough is first dried by pumping, pressing, then by stoving, and it is exposed during a few minutes to a suitable pressure, at a temperature above 200° C.

When the thermoplastics waste is not plasticized, plasticizers are added and the mixture is emulsified with paper pulp to give flexible and water-tight cardboards.

The new industrial product obtained by mixing, in a refining trough, non plasticized polyvinyl chloride and paper pulp in the above mentioned proportions, then by heat pressing this mixture to the shape of plates or sheets, offers very interesting particular properties which neither the polyvinyl chloride, nor the usual cardboard possess.

This new material, although combustible, is non inflammable, indifferent to water and to most of the acids, the alkalis and the organic solvents. Due to the very high absorbing power of the vegetable fibres constituting the paper pulp, its thermoplasticity is much smaller than the plasticity of the polyvinyl chloride; its dimensions are much more steady and the tendency to creep highly reduced, thereby allowing its use in many cases not fitted for usual thermoplastics.

If the polyvinyl chloride used to make this new product is plasticized or is replaced by powdered rubber waste, one obtains a similar material, although chemically less resistant but much more flexible.

This new material can also be obtained by emulsifying for instance a gel of waste of polyvinyl chloride which is after introduced in a refining trough. It is particularly economical to emulsify the paint waste coming from the painting cabins equipped with water screens. In this case, the concentration of the paper pulp is to be normal: the polarity of the mixture can, as usually, be inverted by an addition of aluminium sulphate. To obtain a watertight material, the amount of emulsified waste, figured as dry extract, is to be of about 60% of the total mass.

If the emulsion is obtained from the polyvinyl chloride, the paste coming from the refining trough must undergo a heat pressing. If the paste is obtained from paint waste, it is sufficient to dry it at 90° C., to obtain a cardboard which, after being immersed during 24 hours in water, will not absorb more than 10% of its weight.

What I claim is:

1. A process for making plates and sheets from fragments of polyvinyl chloride, by a simultaneous heat and pressure treatment, said process consisting of applying an even layer of polyvinyl chloride fragments on the lower platen of a first press, both platens being continuously heated at a fixed temperature comprised between 200° C. and 300° C., applying on said layer in said first press, a pressure from 2 to 5 kg./cm.$^2$, said pressure being no more than sufficient to obtain a thickness no greater than the diameter of the larger fragments; releasing this pressure only when the polyvinyl chloride fragments of the layer have just reached a temperature scarcely under their decomposition point, so as to be agglomerated with each other without being altered, the pressure being so applied on the layer of polyvinyl chloride fragments in said first press during a time which is predetermined between 10 minutes and 30 seconds, so as to be longer as said layer is thicker and as the temperature of the press platens is lower; transferring the layer of agglomerated polyvinyl chloride fragments just after the pressure release from the first press rapidly into a second press, the platens of which are continuously at a substantially lower temperature than the platens of said first press; applying finally to said layer of agglomerated polyvinyl chloride fragments a pressure near to the pressure applied thereupon in the first press; and releasing this finally applied pressure when said layer has returned to the ambient temperature.

2. The process of claim 1 wherein the polyvinyl chloride fragments are obtained from waste polyvinyl chloride which has been cleansed of impurities and comminuted.

3. The process of claim 1, wherein the fragments of polyvinyl chloride are mixed before the heat and pressure treatment with paper pulp in a refining trough containing a small amount of water, the mixture obtained thereby being dried by pumping and stoving.

References Cited in the file of this patent

UNITED STATES PATENTS

| | | |
|---|---|---|
| 1,735,668 | Benge et al. | Nov. 12, 1929 |
| 1,966,856 | Groff | July 17, 1934 |
| 2,075,735 | Loomis | Mar. 30, 1937 |
| 2,083,201 | Poppe | June 8, 1937 |
| 2,113,158 | Mayer | Apr. 5, 1938 |
| 2,364,597 | Atwood | Dec. 12, 1944 |
| 2,520,737 | Romeyn et al. | Aug. 29, 1950 |
| 2,563,259 | Miller | Aug. 7, 1951 |
| 2,590,032 | Petry | Mar. 18, 1952 |
| 2,636,542 | Humphreys | Apr. 28, 1953 |
| 2,697,254 | Gordon | Dec. 21, 1954 |
| 2,710,991 | Squires et al. | June 21, 1955 |
| 2,729,770 | Robbins | Jan. 3, 1956 |
| 2,775,994 | Rowe | Jan. 1, 1957 |
| 2,835,776 | Blessing | May 20, 1958 |
| 2,960,727 | Bradshaw et al. | Nov. 22, 1960 |